(No Model.) 2 Sheets—Sheet 2.

J. P. HOWE.
COMBINED CULTIVATOR AND HARROW.

No. 390,126. Patented Sept. 25, 1888.

Witnesses:
Edwin M. Johnson
J. M. Baird

Inventor:
John P. Howe

United States Patent Office.

JOHN P. HOWE, OF HARTINGTON, NEBRASKA.

COMBINED CULTIVATOR AND HARROW.

SPECIFICATION forming part of Letters Patent No. 390,126, dated September 25, 1888.

Application filed August 22, 1887. Serial No. 247,603. (No model.)

*To all whom it may concern:*

Be it known that I, JOHN P. HOWE, a citizen of the United States, residing at Hartington, in the county of Cedar and State of Nebraska, have invented certain new and useful Improvements in Combined Cultivator and Harrow; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to combined harrows and cultivators, and has for its object the provision of a harrow that will be composed of a series of independent sections, each being constructed alike and having an independent connection with the draft-bar. The sections are wedge-shaped and have their side bars inclined at the same angle, and are arranged in series with the small end of one section opposite the large end of the next section, whereby the side bars and the intermediate bars of all the sections composing the harrow will be parallel. The cultivating attachment is applied to the rear end of one or more sections, and is preferably fixedly secured thereto, to rise and fall or move with the said section.

The improvement consists of the novel features which hereinafter will be more fully described and claimed, and shown in the accompanying drawings, in which—

Figure 1:
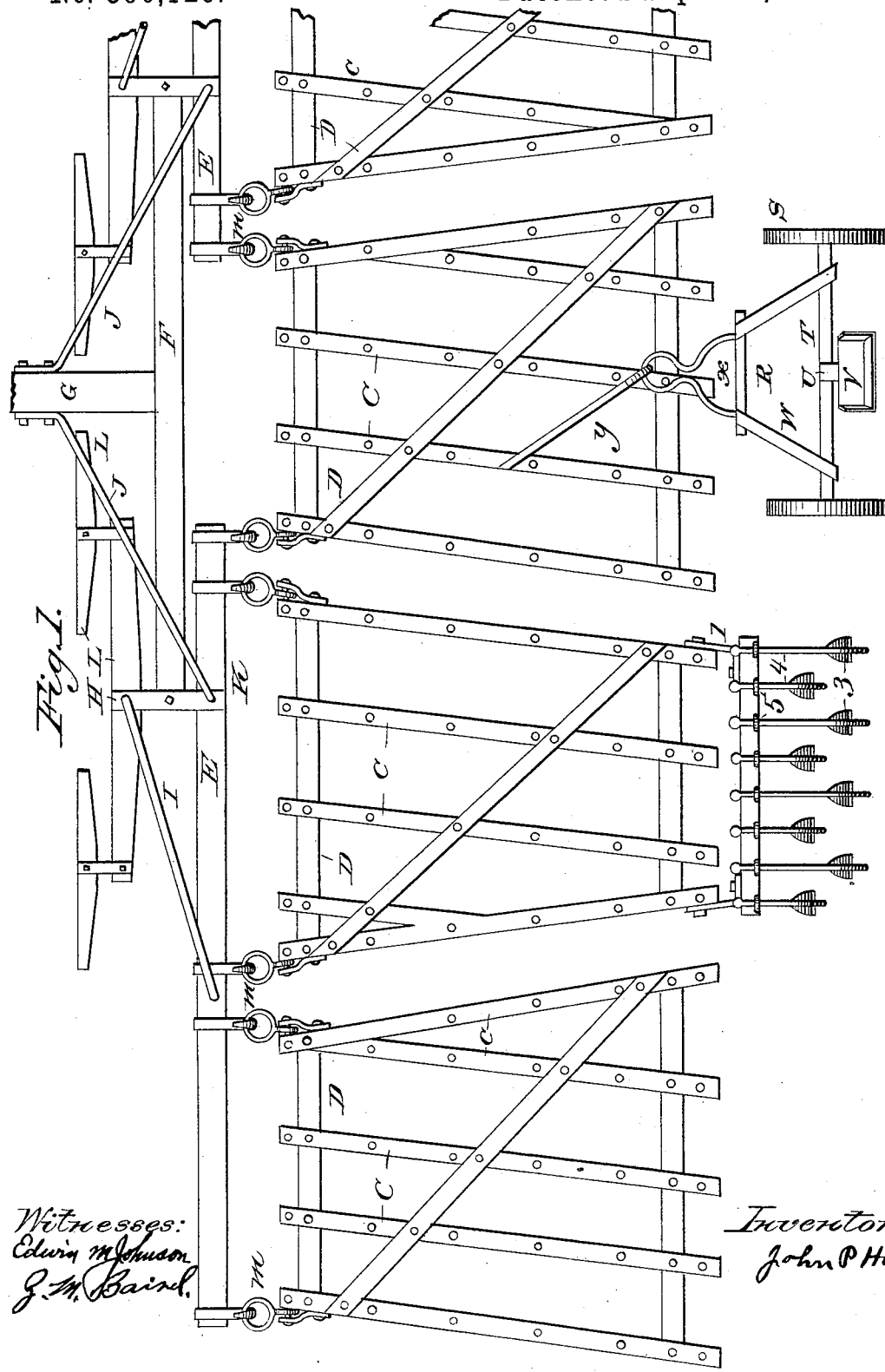
Figure 2:
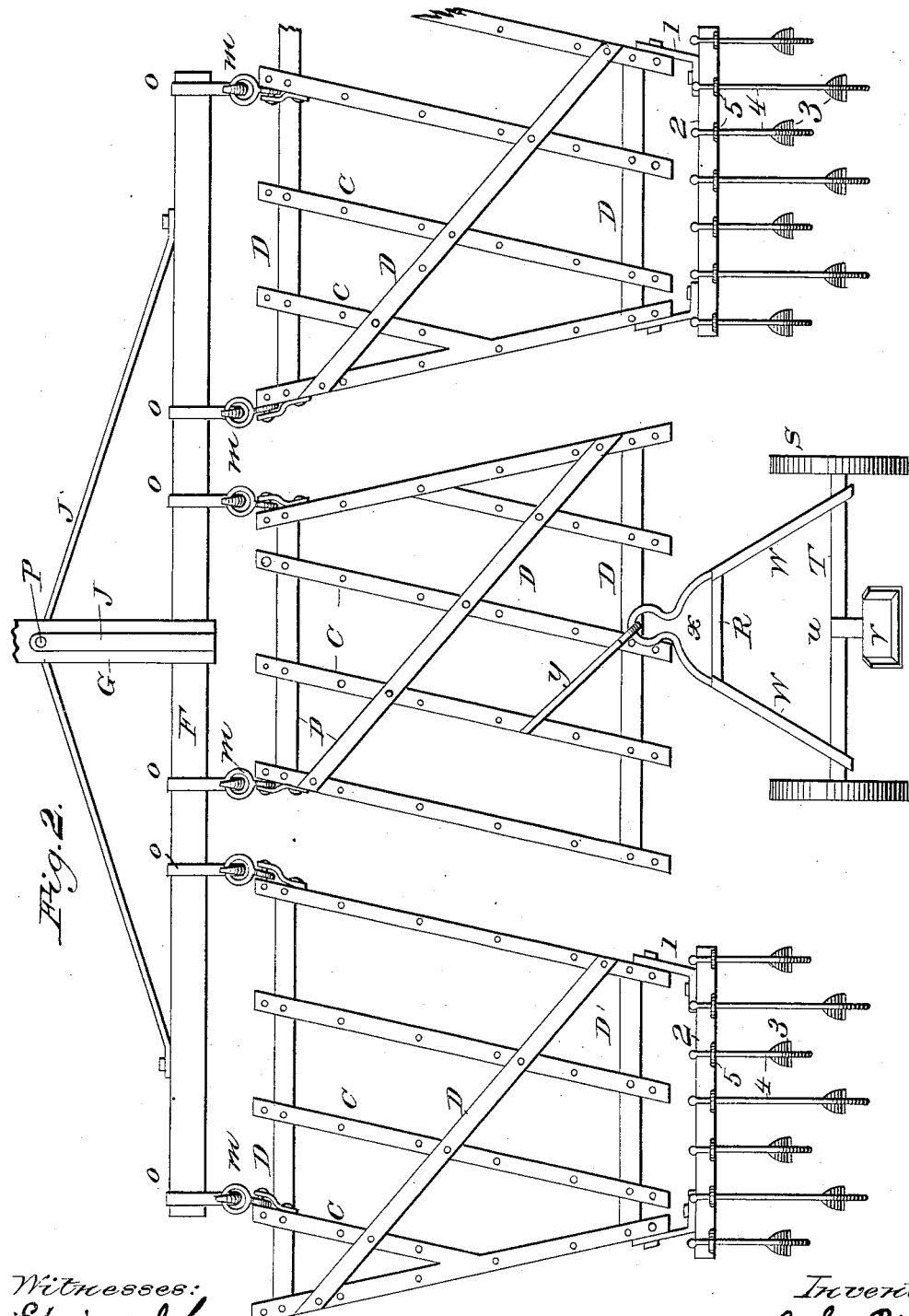

Figure 1 is a top plan view, parts being broken away, of a combined harrow and cultivator of my construction embodying my invention; and Fig. 2 is a top plan view of a modification.

The harrow-sections are constructed alike, and a detailed description of one will suffice for all. A harrow-section is composed of the side bars, A, which are oppositely inclined, the end bars D and D', the intermediate tooth-bars, C, and the diagonal brace-bar D², which extends from one side bar to the other, and is connected with the intermediate tooth-bars. The end bars D and D' are parallel with each other, and the intermediate tooth-bars are parallel with each other and with one of the side bars, A.

In constructing a harrow the sections are arranged with the large end of one and the small end of the other alternating with each other, so as to preserve about the same distance between the side bars as exists between the tooth-bars, and have the teeth disposed so that no part of the ground will remain untouched after the harrow is drawn over it once. The sections are secured to a single draft-bar, as F, or to a draft-bar composed of two parts, E E, as shown in Fig. 1. The draft-bar is provided with the clip O, having a hook, and the section is provided with the plate M, which is fastened to the section at its inner end and branches out at its outer end to embrace the end of the coupling $m$ between it and the said section, the said end of the coupling being held by the bolt $m'$. The front end of the coupling terminates in a ring which fits over the hook on the clip Q.

The cultivator-bar 2 is secured at its ends to the harrow-section by the angle-brackets 1, which are bolted to the said bar 2 and to the side bars of the said harrow-section, as shown. The teeth 3 are fastened to the standards 4, which are bolted to the bar 2 and pass through the eye-plates 5.

The sulky or riding attachment is composed of the inclined bars W W, the end bars R and T, the bail or clevis X, the seat V, the seat-support U, and the wheels S, mounted on extensions of the end bar T. The short brace-bar Y connects the sulky with the section.

The tongue G is fastened to the draft-bar F by the strap J and the lateral braces J', and is connected with the draft-bars E by the lateral braces J², the short bars K, and the cross-bar F'. The short bar K is braced by the stays I and supports the doubletrees L, which have the singletrees L at each end.

It will be observed that only some of the harrow-sections are provided with cultivator-shovels in their rear; but in practice each harrow-section will be provided with cultivator-shovels. These shovels, trailing in the rear of the smoothing-harrow, serve as markers and make furrows for the reception of the grain.

Having thus described my invention, what I claim, and desire to secure by Letters Patent, is—

1. The herein shown and described harrow, composed of a draft-bar, the series of wedge-shaped harrow-sections arranged with the small end of one section opposite and alternating with the large end of the adjacent section, the plates M, the hooked clips O, the couplings m, and the bolts m', connecting the said harrow-sections with the draft-bar, whereby each section is free to have an independent movement, the cultivator-shovels, arranged in the rear of the harrow-sections, and the riding attachment, substantially as described, for the purpose specified.

2. The combination, with the harrow-section and the cultivator-bar having cultivator-teeth, of the angle-brackets bolted to the bar and to the said harrow-section, substantially as and for the purpose described.

JOHN P. HOWE.

Witnesses:
E. M. JOHNSON,
FRED. M. KIMBALL.